United States Patent
Boezen

(10) Patent No.: US 9,185,757 B2
(45) Date of Patent: Nov. 10, 2015

(54) MULTI-CHANNEL LED DRIVER ARRANGEMENTS

(71) Applicant: NXP B.V., Eindhoven (NL)

(72) Inventor: Hendrik Boezen, Nijmegen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/204,727

(22) Filed: Mar. 11, 2014

(65) Prior Publication Data

US 2014/0285098 A1  Sep. 25, 2014

(30) Foreign Application Priority Data

Mar. 19, 2013  (EP) ..................... 13159861

(51) Int. Cl.
*H05B 37/00*  (2006.01)
*H05B 33/08*  (2006.01)

(52) U.S. Cl.
CPC .......... *H05B 33/0815* (2013.01); *Y02B 20/346* (2013.01)

(58) Field of Classification Search
USPC .............. 315/185 R, 291, 294, 297, 299, 307
See application file for complete search history.

(56) References Cited

U.S. PATENT DOCUMENTS

| | | | |
|---|---|---|---|
| 7,843,150 B2 * | 11/2010 | Wang ................. | H05B 33/0815 315/185 R |
| 8,232,743 B2 * | 7/2012 | Chen et al. .................... | 315/307 |
| 2009/0066262 A1 * | 3/2009 | Tateishi et al. ................ | 315/291 |
| 2010/0320936 A1 | 12/2010 | Yao | |
| 2012/0268011 A1 * | 10/2012 | Shiu et al. ..................... | 315/121 |
| 2012/0268023 A1 | 10/2012 | Yan et al. | |
| 2013/0038210 A1 | 2/2013 | Stoeger | |
| 2013/0049626 A1 | 2/2013 | Zhang et al. | |
| 2014/0070710 A1 * | 3/2014 | Harris ....................... | 315/185 R |

FOREIGN PATENT DOCUMENTS

| | | |
|---|---|---|
| CN | 101500354 A | 8/2009 |
| DE | 101 19 491 A1 | 7/2002 |
| EP | 2 413 660 A1 | 2/2012 |

OTHER PUBLICATIONS

Linear Technology, "LTC3862-2, Multi-Phase Current Mode Step-Up DC/DC Controller", 1-44 pgs. (2012).
Semiconductor Components Industries, LLC, NCV78663, Power Ballast and Dual LED, Driver for Automotive Front Lighting, 37 pgs. (Apr. 2012).
Extended European Search Report for EP Patent Appln. No. 13159861.7 (Aug. 21, 2013).

* cited by examiner

*Primary Examiner* — Tung X Le

(57) ABSTRACT

LED driver arrangements are disclosed comprising: an input; a plurality of switched mode boost converters, each connected to the input; and a plurality of outputs, each output having a different voltage and being for driving at least one LED string; wherein each of the plurality of switched mode boost converters is configurable to output of any one of the plurality of outputs. Controllers for such arrangements are also disclosed.

11 Claims, 5 Drawing Sheets

MULTI-CHANNEL LED DRIVER ARRANGEMENTS

CROSS-REFERENCE TO RELATED APPLICATIONS

This application claims the priority under 35 U.S.C. §119 of European patent application no. 13159861.7, filed on Mar. 19, 2013, the contents of which are incorporated by reference herein.

FIELD

This invention relates to multi channel LED driver arrangements, LED lighting circuits and controllers therefor.

BACKGROUND

In fields such as automobile lighting, it is becoming increasingly common to require power to be supplied at more than one voltage.

Consider as a non-limiting example an application in which lighting is required to be provided both by a string of several or many LEDs each of which have moderate brightness, as well as by a string of just a few LEDs each of which is a so-called "high brightness" LEDs.

Conventionally, the power to supply each string of LEDs, typically at a constant current, is provided by a respective buck converter. In applications such as automobile applications, the input supply voltage is typically lower than the maximum required voltage, and so a boost converter is included in order to increase the voltage to that needed. The output power from the boost converter, which provides the input power to the buck converters, must be at a voltage higher than the maximum required voltage—which is typically the voltage of the longest string of LEDs and including a small "overhead" allowance. The buck converter that drives the shortest string would then have to work at a very high current and low duty cycle. Operation at low duty cycle is generally difficult to effect at a high efficiency.

SUMMARY

According to a first aspect there is provided an LED driver arrangement comprising: an input; a plurality of switched mode boost converters, each connected to the input; and a plurality of outputs, each output having a different voltage and being for driving at least one LED string; wherein each of the plurality of switched mode boost converters is configurable to output of any one of the plurality of outputs.

Since the outputs have different voltages, they may be tailored to the individual loads. For example, in an application in which there are two short strings of high brightness LEDs, and a single longer string of medium brightness LEDs such that twice as much power is required at the relatively low voltage to drive the short strings as is required at the relatively high voltage to drive the longer string, then a first output may be chosen to be suitable for the shorter strings, and a second output may be chosen to be suitable for the longer string. In that example case, it may be preferred that the arrangement comprises three boost converters, two of which are configured to output power to the first output, and one of which is configured to output power to the second output.

By providing that the converters are configurable to output to any one of the plurality of outputs, the same arrangement may be used in a different application in which a single string of high brightness LEDs is used along with two strings of medium brightness LEDs. For use in this different application, the boost converters may be configured such that the output of one converter is directed to the first output, and the output of two converters are directed to the second output.

As a result, the same arrangement may be more versatile or suitable for a wider range of applications. Where the arrangement is manufactured as a single module, this may in turn lead to a reduction in the required range of product types, leading to lower overall inventories, and decreased cost.

In embodiments the plurality of switched mode boost converters is configured to each switch at the same frequency, and may further comprise a phase generator configured to control a relative phase of switching of each of the plurality of switched mode boost converters. Operating the converters at the same switching frequency may make control simpler and may result in a more predictable power consumption from the power supply. Although in many if not most applications—particularly those relating to automobile use—the power is derived from a battery, in applications in which the power supply is ultimately derived from a mains supply this may result in improved power factor and lower harmonic distortions on the mains.

In embodiments the phase generator is configured to evenly distribute the relative phase of switching of each of the switched mode boost converters which is configured to output to a one of the plurality of outputs. In such embodiments, power may be supplied relatively smoothly to that specific output. As a result, a load, which typically will be a buck converter, which is connected to that output may not require to have to cope with uneven input. Having a smooth and predictable input may result in lower specification components and may potentially provide a cost saving.

In such embodiments, it may been not be needed to distribute the phase of all of the boost converters, but merely those which are providing power to a specific one of the outputs. In other embodiments the phase generator is configured to evenly distribute the relative phase of switching of each of the plurality of switched mode boost converters. Such embodiments may provide for particularly smooth or even use of input power.

In embodiments each of the switched mode boost converters is configured to operate using peak current control, and the arrangement further comprises a respective peak current control signal generator corresponding to each of the outputs. In arrangements in which more than one boost converter provides power to a specific output, peak current control is a convenient method of control, since the same control signal may be provided to each of the relevant boost converters, to provide an output at the matched voltage levels without requiring a high level of signal processing Further, this may result in a load which is evenly distributed across each of the boost converters. However, the invention is not limited thereto and other forms of control, such as without limitation on-time control, may alternatively be used.

In embodiments, the LED driver arrangement further comprises a switching arrangement configurable to direct a respective peak current control signal from the peak current control signal generator corresponding to a one of the plurality of outputs, to each of the switched mode boost converters which are configured to output to that respective one of the plurality of outputs. Such a switching arrangement may be programmable. In other embodiments, the directing of the peak current control signal to the appropriate boost converters may be established by means of, for example, wired links which are formed in an application circuit.

According to a second aspect, there is provided an LED driver arrangement according to any preceding claim, further comprising a buck converter for driving at least one LED string and having as an input a one of the plurality of outputs. The LED driver arrangement may comprise at least one further buck converter, each for driving respective at least one LED strings and arranged such that each of the plurality of outputs is input to a respective one of the buck converters.

According to a further aspect there is provided a controller, for an LED driver according to any preceding claim and comprising a plurality of switched mode boost converter controllers, a phase generator, first and second peak current control signal generators, and a plurality of switched mode buck converter controllers, the controller being configurable: to control a first group of the switched mode boost converters in response to one or more outputs from the phase generator and a peak current control signal from the first peak current control signal generator; and to control a second group of the switched mode power boost converters in response to one or more further outputs from the phase generator and a further, different, peak current control signal from the second peak current control signal generator.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

Figure 1:
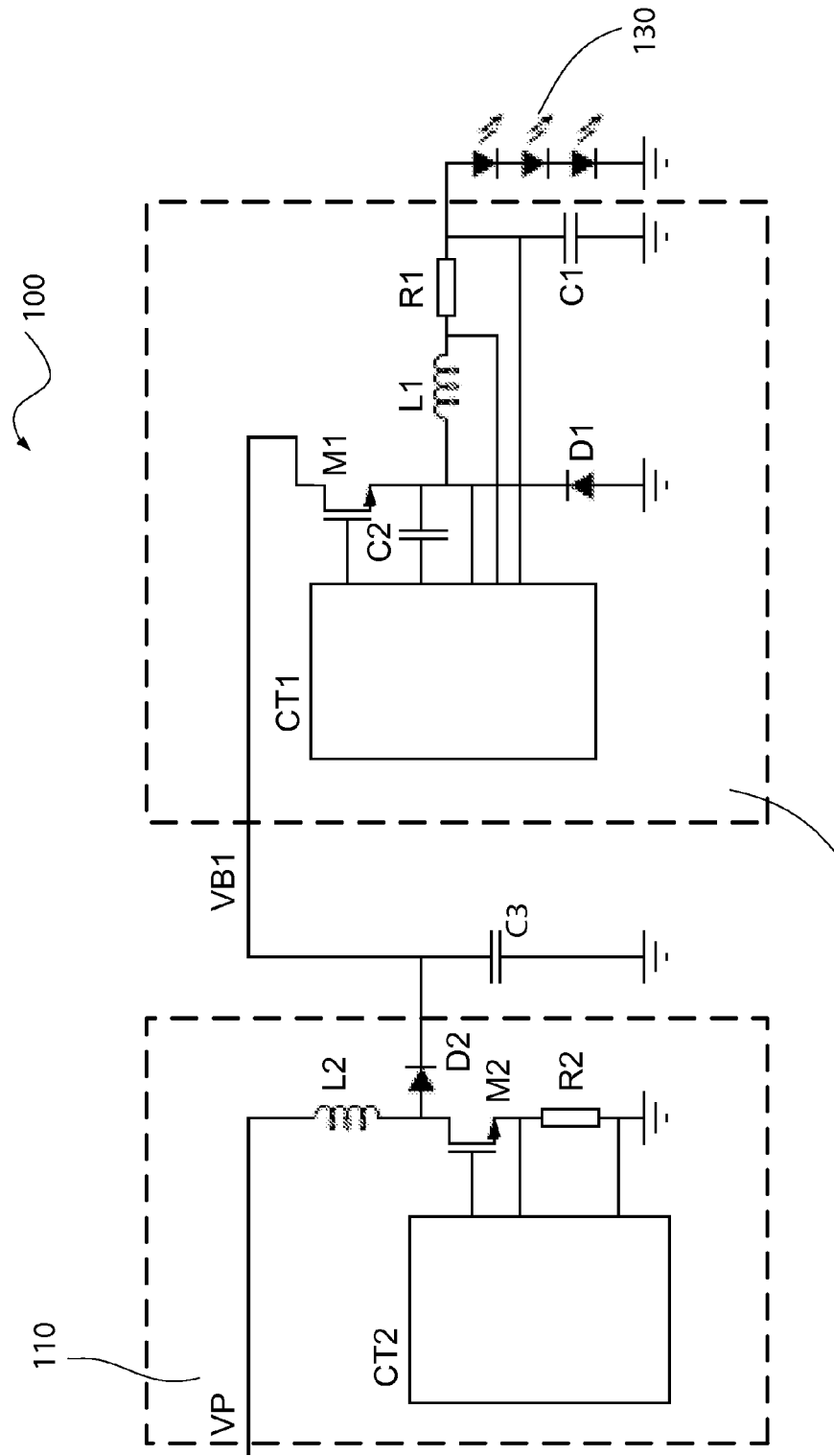
FIG. 1 shows a known LED driver arrangement.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

FIG. 1 shows a known LED driver arrangement 100. Driver arrangement 100 comprises a switched mode boost power converter 110 arranged in series with a switched mode buck power converter 120. Boost converter 110 comprises an inductor L2, which is switchably connected between an input VP and ground, by means of switch M2. A sensing series resistance R2 is arranged in series with and on the low side of switch M2. The node between inductor L2 and switch M2 is connected to intermediate capacitor C3 by means of diode D2. Switch M2 is controlled by controller CT2. In operation, as will be familiar to the skilled person, controller CT2 periodically closes switch M2. An increasing current flows through inductor L2; the value of the current is sensed by means of the voltage across sense resistor R2. In the case that the boost converter is operating in peak current control mode, once the current reaches a predetermined peak level, switch M2 is opened. Current through the inductor continues to flow, but is now directed to charge intermediate capacitor C3. Once steady state is achieved, the voltage VB 1 across capacitor C3 is regulated to be constant value.

Intermediate capacitor C3 also acts as input to the buck converter 120. In this converter, the input (intermediate capacitor C3) is switchably connected to inductor L1 by means of switch M1. This terminal of inductor L1 is also connected to ground via a diode D1. The other terminal of inductor L1 is connected to the output and the output capacitor C1, via a sense resistor R1. A further capacitor C2 may be included and used to provide a voltage to charge the gate of switch M1, in order to ensure that when M1 is switched on, the gate voltage is higher than the supply voltage VB1. As will also be familiar to the skilled person, the input is periodically connected to the inductor L1 by switch M1, and the current through the inductor increases. Switch M1 is then closed, and the inductor current falls whilst providing charge to capacitor C1. Capacitor C1 acts as a smoothing capacitor for the load. The buck converter in this configuration delivers a constant current to the load, which as shown may be a string 130 of LEDs.

In order to increase the power which may be supplied to the LEDs, it would be possible to use more than one boost converter stage 110. Preferably these stages would operate at the same switching frequency, but with staggered phase, that is to say the their respective switches M2 would be closed at different times, in order to even out to the flow of charge to intermediate capacitor C2, and thereby reduce the ripple on the intermediate voltage level VB 1. Operating each of the boost converters 110 in peak current control mode, with the same peak current would ensure that the total power delivered to the B1 is shared among the phases of the boost stage.

In multichannel applications, separate buck converters 120 may be used in order to deliver the separate voltages required by different channels. However, it will be appreciated that the voltage of VB1 has to be regulated higher than is required is for the longest LED string. However, for a buck converter connected to the shortest LED string the voltage difference between VB1 and the voltage required by that string may be large, which necessitates a large conversion ratio, which in turn may lead to low efficiency of operation.

This loss of efficiency might be avoided or reduced by use of different voltages VB1 to power buck converters driving the different strings. But, until the respective power requirements at the different voltages is known, it is not possible to properly specify the power rating of the boost converter converters required to provide the regulated voltage at each of the different voltages VB1.

Figure 2:
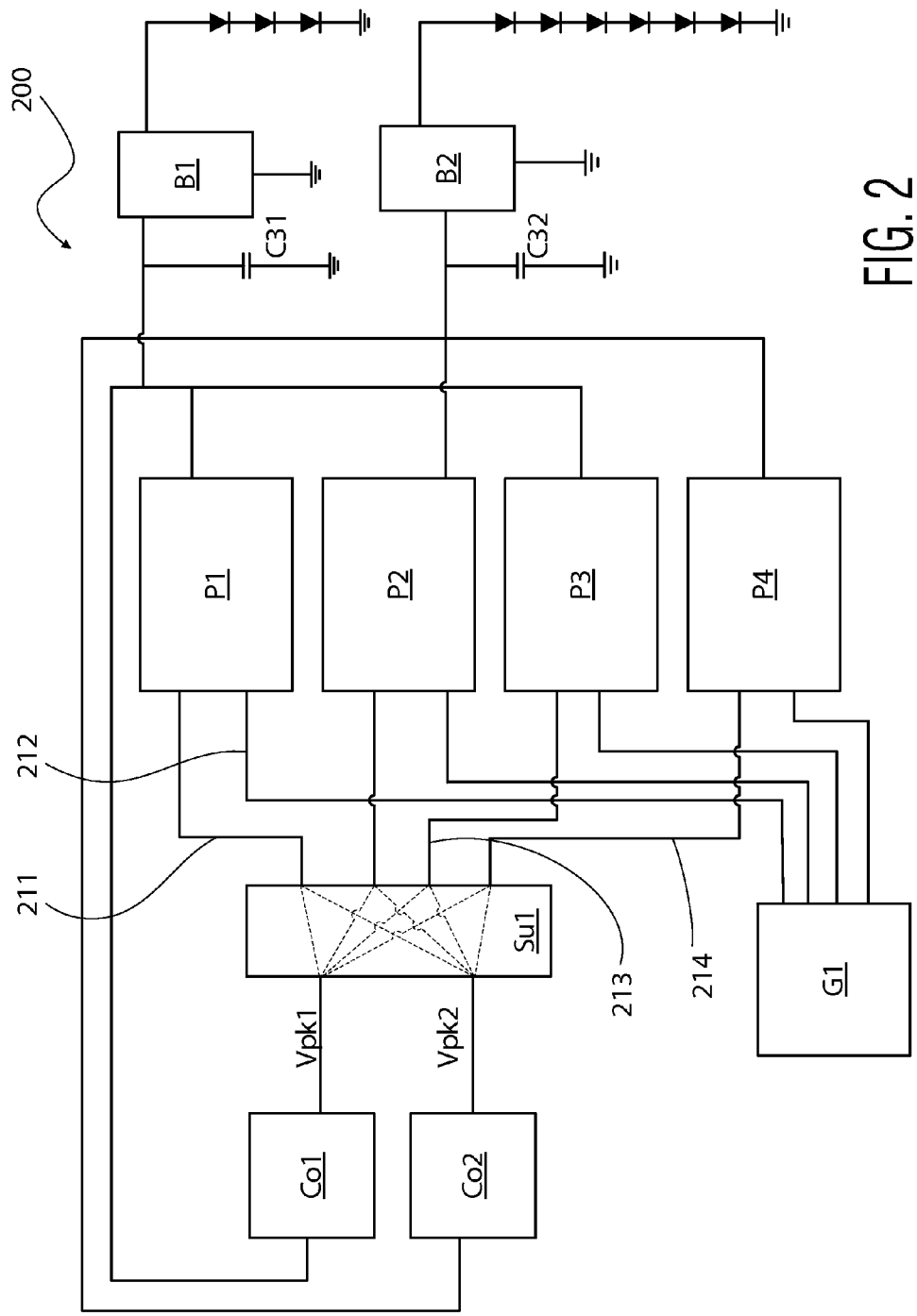
FIG. 2 shows a schematic of a multichannel LED driver arrangement according to embodiments.

FIG. 2 illustrates a schematic of an LED driver arrangement 200 according to embodiments. The configuration shown in FIG. 2 is a two-channel driver arrangement, and is thus equivalent to two separate driver arrangements 100. Each of the separate channels has a buck converter (B1, B2, respectively) equivalent to the buck converter 120. The input to each buck converter is provided by respective intermediate capacitor C31 and C32. Furthermore, each channel has a boost converter sub-system for supplying power to the respective intermediate capacitor C31 and C32. However, it will be noted that unlike the single channel driver arrangement 100, in this case and in this configuration each channel has two boost converters (respectively P1 and P3, and P2 and P4) instead of the single boost converter 110.

In the configuration shown, boost converters P1 and P3 are connected to intermediate capacitor C31, and boost converters P2 and P4 are connected to intermediate capacitor C32. However, the same LED driver arrangement 200 may be configured differently (as will be shown in FIG. 3). For example, it may be configured such that three of the boost converters—say P1, P2 and P3—are all connected to intermediate capacitor C31 and first channel buck converter B1, and only one boost converter—P4 in this example—is connected to intermediate capacitor C32 and second channel buck converter B2. Thus the LED driver arrangement is configurable; the allocation of some or all of the boost converters to specific buck converters is not predetermined during manufacture of the assembly itself. It should be noted that the term configuration does not necessarily require that the arrangement be configurable by the end user. Rather, the arrangement may be configurable during assembly of a particular application—for instance assembly of a lighting board in an automobile application.

The boost converters P1 . . . P4 are controlled by control signals provided along lines 211, 212, 213 and 214 and supplied by controllers CO1 and CO2. A switch unit SU1 is included between the controllers CO1 and CO2 and the lines 211, 212, 213 and 214, and is configured to determine which controller controls each of the boost converters P1 . . . P4, by switching the respective control line to the appropriate controller. In this embodiment, each controller CO1, CO2, is a peak current controller. Thus, in this embodiment in the configuration shown in FIG. 2, the outputs from boost converters P1 and P3 are determined by the peak current controller CO1, and the outputs from the boost converters P2 and P4 are determined by the current controller CO2. The skilled person will appreciate that the configuration of the switch unit SU1 should match the configuration of the outputs of the boost converters. That is, signal lines 211 and 213 should, in the configuration shown, be routed to controller CO1, and signal lines 212 and 214 should be routed to controller CO2. In the configuration shown, the outputs from boost converters P1 and P3 are connected to controller CO1 and the outputs from boost converters P2 and P4 are connected to controller CO2.

The skilled person will appreciate that the control signals may be provided as digital signals or analog signals. Use of digital signals, in particular, may enable digital addressing of the boost converters P1 . . . P4. Thus the control lines shown in FIG. 2 could be implemented as virtual control lines in a serial or parallel control bus, rather than necessarily being fixed, separate lines as shown. In particular in the case digital control, the switch unit SU1 may be implemented as a logical switch, or may implemented as an addressing unit, such that control information is broadcast to all boost converters, but has address labels attached in order that it is only acted on by the of each controller, for which the control information was intended.

The embodiment shown in FIG. 2 also comprises a phase generator G1. The phase generator is connected to the gate-drive of the switch in each of the boost converters P1 . . . P4, and controls the turn-on moment of the converter switch, by providing an appropriate signal to close the switch.

Figure 3:
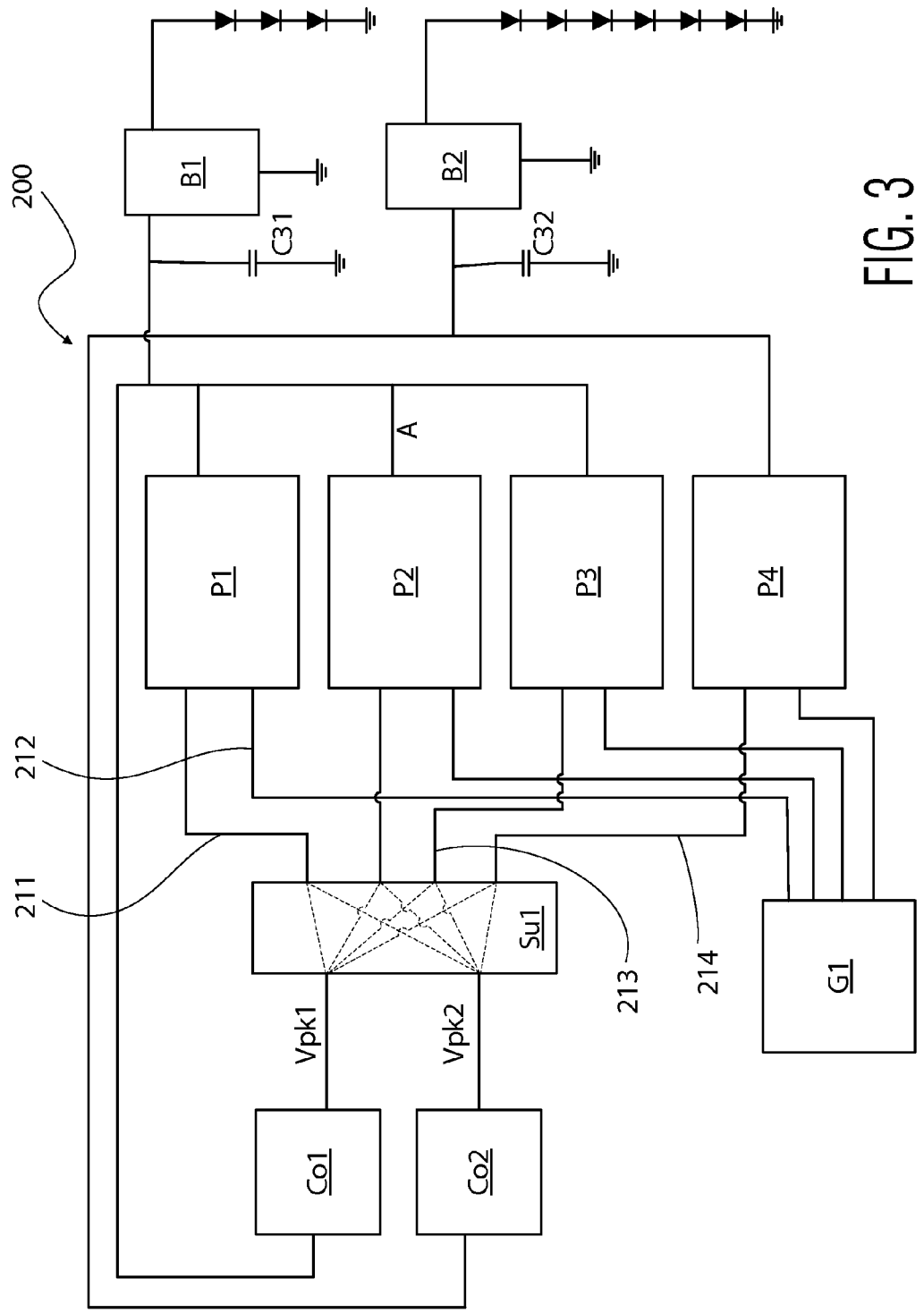
FIG. 3 shows a schematic of the arrangement of FIG. 2, in a different configuration.

FIG. 3 shows the same LED driver arrangement as shown in FIG. 2, but in a different configuration. In this configuration three of the boost converters, that is P1, P2 and P3, are connected to intermediate capacitor C31 and buck converter B1, and only one of the boost converters, that is P4, is connected to intermediate capacitor C32 and buck converter B2. In this configuration, the same arrangement of boost and buck converters provides relatively more power to B1, than in the configuration shown in FIG. 2. It will be appreciated, that the only structural differences between this configuration and that shown in FIG. 2 may be the connection (marked "A" in FIG. 3) of the output from P2 to first channel buck converter B1 and first channel controller Co1, instead of to second channel buck converter B2 and second channel controller Co2. Of course, it will be recognised that switch SU1 will also be configured differently, to route control information from first channel controller Co1 to each of boost converters P1, P2 and P3, and control information from second channel controllers Co2 to only boost converter P4.

Figure 4:
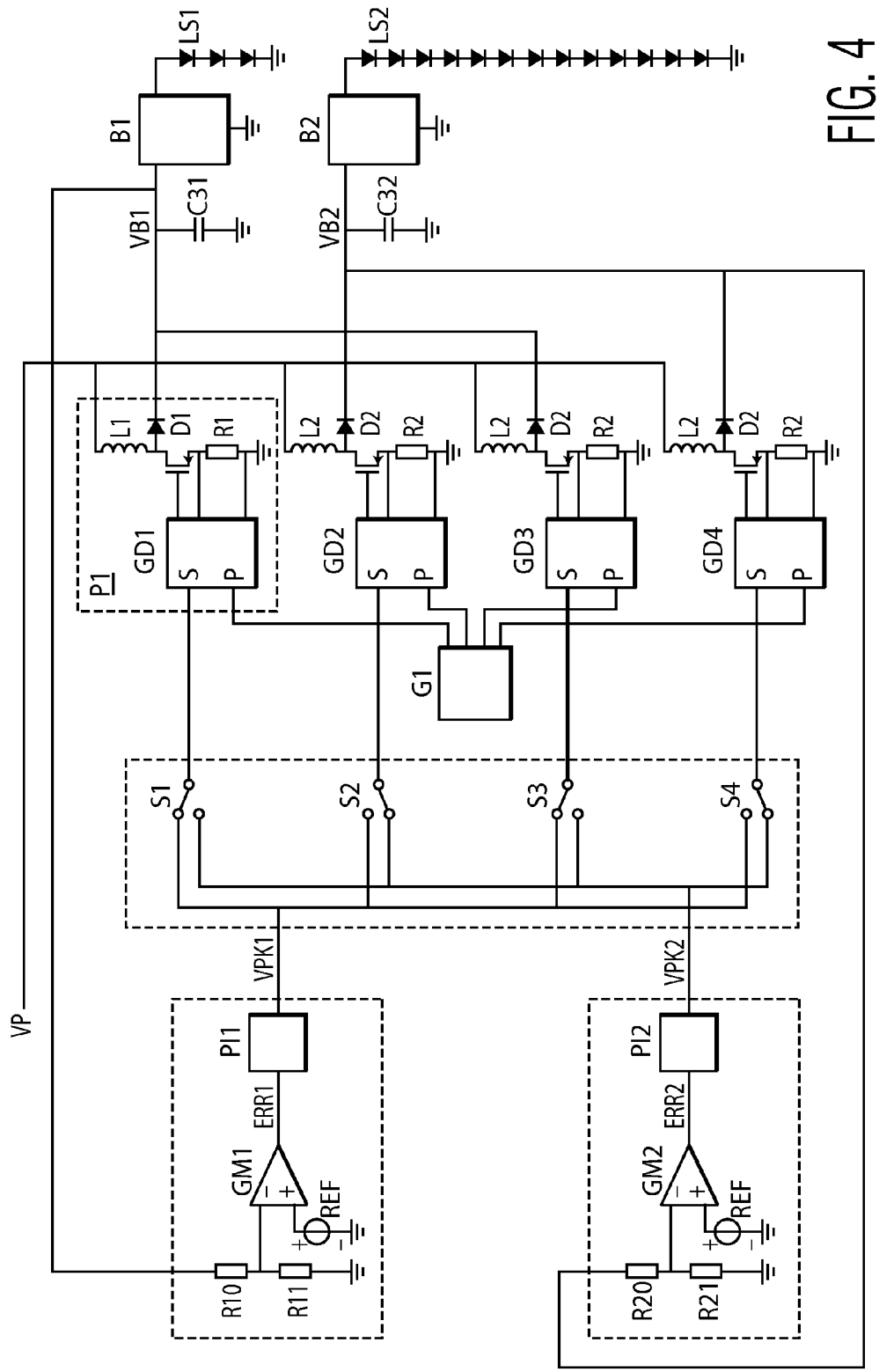
FIG. 4 shows the multichannel LED driver arrangement of FIG. 2 in more detail.

FIG. 4 shows the multichannel LED driver arrangement of FIG. 2 in more detail. Boost converter P1 is depicted as a conventional boost converter, and has a gate driver GD1, and switch M1, inductor L1, diode D1 and resistor R1, each of which may be external components. The corresponding principal components of boost converters P2, P3, and P4 are shown, similarly. Switching unit Su1 is depicted as four separate switches S1 . . . S4, for respective boost converters P1 . . . P4. In this embodiment, controller Co1 is a peak current controller. As will be familiar to the skilled person, the peak current controller comprises a voltage divider R10, R11, which provides a scaled version of the voltage on the intermediate capacitor C31 to an error amplifier GM1. The error amplifier GM1 has a reference voltage REF as its other input. An output ERR1 from error amplifier GM1 is directed to the input of a Proportional-Integrating (PI) controller PI1, which regulates the peak current value Vpk1. The second channel controller Co2 is also a peak current controller. This peak current controller comprises corresponding principal components being resistive divider R20, R21, error amplifier GM1, and PI controller PI2, which are arranged similarly, in order to provide peak current control for the second channel.

In embodiments, the error amplifiers GM1 and GM2 are tracking analog to digital converters, and the error signals ERR1 and ERR2 are digital signals.

Operation of the peak current controllers will be familiar to the skilled person: when for instance VB1 is too low, GM1 provides an error voltage ERR1, which drives up Vpk1 at the output of PI1, leading to a higher peak current in the inductors L1 and L3, thereby delivering more power to VB1 until VB1 reaches its target value.

The PI controllers PI1 and PI2 may use a capacitor to integrate charge; alternatively, they may be implemented as digital integrators. It may be that they are entirely integrated into the same integrated circuit as, for instance, one or more boost converter gate driver. Adjustment of one or both of the proportional and integrating parts of one of each of the PI controllers may be possible, for instance by switching on parts of a capacitor.

In the configuration shown of the arrangement, the boost converters P1 and P3 are connected to the first channel—that is to say, intermediate capacitor C31 and buck converter B1—and the boost converters P2 and P4 are connected to the second channel—that is to say, intermediate capacitor C32 and buck converter B2. In order to correspond to this, the peak current control signal Vpk1 from the first channel peak controller is routed, by switches S1 and S3 of the switching unit Su1, to boost converters P1 and P3, and the peak current control signal Vpk2 from the second channel peak controller is routed, by switches S2 and S4 of the switching unit Su1, to boost converters P2 and P4. As shown in FIG. 2, the phase—that is to say the moment of turn-on of the switch—of each back converter is controlled by phase generator G1.

Whereas in the arrangement shown in FIG. 4, the voltages VB1 and VB2 at the intermediate capacitors C31 and C32 are determined by the reference voltage levels REF in the controllers Co1 and Co2, in other embodiments, the one or both of these voltages may be made programmable, for example by adding a digital to analog converter whose output is added at the input of GM1 to make the target voltage programmable.

Phase generator G1 also controls the switching frequency of the converters. In embodiments, these may be made programmable, in order to accommodate a range of different size inductors, for which different switching frequencies may be desirable.

It will be appreciated that, in embodiments, programming of one or more of the components or subsystems—such as the phase generator, the PI controllers etc, may be carried out using standard or known programming interfaces such as a SPI (serial peripheral interface) bus.

Figure 5B:
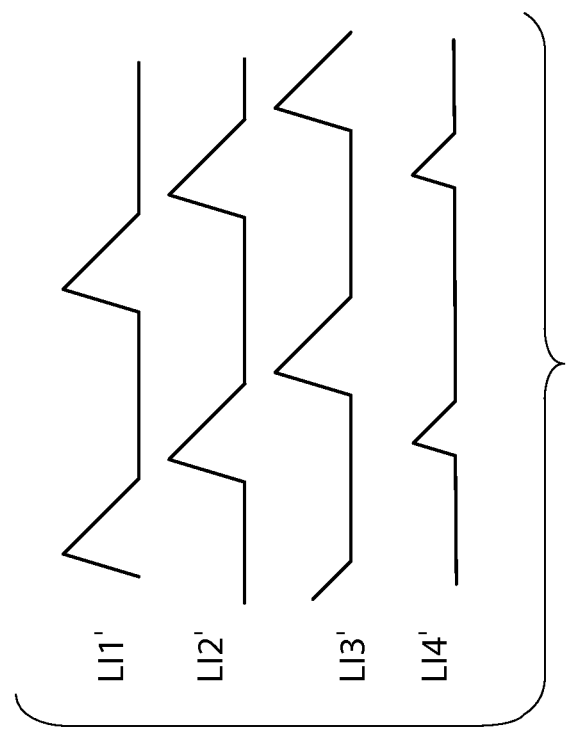
FIGS. 5A-5B show timing diagrams for the inductor current in boost converters, according to embodiments.
Figure 5A:
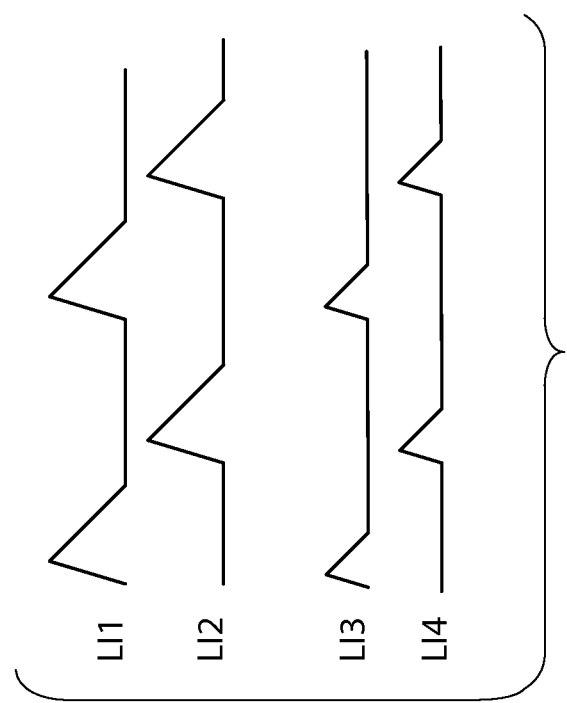

FIGS. 5A-5B show timing diagrams for the inductor current in boost converters, according to embodiments, and in two configurations. FIG. 5A shows the inductor currents LI1 . . . LI4 through inductors L1 . . . L4 in an arrangement configured as shown in FIGS. 2 and 4.

When the gate drive GD1 of P1 closes power switch M1, current builds up in the inductor L1, until a predetermined peak value is reached, at which moment the switch is opened and the current gradually and linearly falls back to zero. Similarly, when the gate drive GD3 of P3 closes power switch M3, current builds up in the inductor L3, until a predetermined peak value is reached, at which moment the switch is opened and the current gradually and linearly falls back to zero. Because the two boost converters are driven from the same controller and control signal Vpk1, the peak current is the same. However, the phase of the current pulses is different. As described above, this is controlled by the phase generator, and in the embodiment shown, the pulses are 180° out of phase.

In a similar fashion, when the gate drive GD2 of P2 closes power switch M2, or gate drive GD4 of P4 closes power switch M4, current builds up in the respective inductor L2, or L4 until a predetermined peak value is reached, at which moment the switch is opened and the current gradually and linearly falls back to zero. Once again, because the two boost converters are driven from the same controller and control signal Vpk2, the peak current is the same. However, since Vpk1 is generally different from Vpk2, the currents are not the same as those of LI1 and LI3. Once again, though, the phase of the current pulses is different. As described above, this is controlled by the phase generator and in the embodiment shown the pulses are also 180° out of phase. Finally, in this example the start of the pulses on LI1 are in phase with those on LI3—although they have different durations, due to the different peak currents. However, in other embodiments, the phases may be different arranged by phase generator G1. In particular, it may be that the phases of LI1 . . . LI4 are evenly distributed—which in the case of four boost converters results in a 90° phase difference between consecutive converter pulses. Further the pulses may be interleaved (such as LI1, LI2, LI3 then LI4 in that sequence), or grouped, (such as LI1, LI3, LI2 then LI4 in that sequence).

Since each of the converters may have the same size inductor, the rate of rise and fall of each LI1 . . . LI4 may be the same.

FIG. 5B shows the inductor currents LI1 . . . LI4 through inductors L1 . . . L4 in an arrangement which may be the same as that shown in FIGS. 2 and 4, but is differently configured as shown in FIG. 3. In this configuration, the first three inductor current pulses (LI1', LI2', and LI3'), in the first three inductors L1, L2 and L3 are the same size, and only LI4' is different, since P1, P2 and P3 are all connected to the first channel, and only P4 is connected to the second channel. In this configuration, the phases of LI1', LI2' and LI3' are evenly distributed—that is to say, 120° apart, and not necessarily tied to the phase of LI4'.

In the configuration shown in FIG. 5A and FIG. 5B, the converters are being operated in discontinuous current mode (DCM). At higher output powers, the system may run in continuous conduction mode (CCM), in which the inductor currents do not return to zero. As will be familiar to the skilled person, in CCM operating conditions, the current in the inductor increases during the "on-time" during which the respective switch is in a closed condition, and falls when the switch in is an open condition. However, in continuous conduction, the switch is closed to commence a subsequent on-time period before the current in the inductor drops to zero.

Whereas the above embodiments have used peak current control, it will be appreciated that the invention is not limited thereto. For example, the boost converters may be controlled by on-time control.

One or more of the parts of the embodiments described above may be included in a single integrated circuit. For example, a single integrated circuit may comprise at least some of two or more channel controllers Co, three of more boost converter gate drivers GD, switching unit Su, and phase generator G1.

The embodiments described above included four boost converters and two channels—each channel have a single buck converter. However, in other embodiments, different numbers such as three, five, or another number of boost converters may be connected to the input, and may be configurable to provide power to two or more channels—that is to say, to two, three, or even more intermediate capacitors, at least some of which are intended to operated at different voltages. Moreover, although a single buck converter has been depicted as being used supplied from each intermediate, the skilled person will appreciate that this is, to some extent, a matter of convenience, and in other embodiments, one or more of the channels may comprise two or more buck converters.

The skilled person will appreciate that, although references have been made to automobile applications, such applications are examples only, and the disclosure may extend to other applications, in which LEDs are required to be driven from different voltage supplies and generally not from a mains-connected supply. These may include other transport-related applications, for example boating, emergency lighting, or other off-grid applications. From reading the present disclosure, other variations and modifications will be apparent to the skilled person. Such variations and modifications may involve equivalent and other features which are already known in the art of LED drivers, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. An LED driver circuit comprising:
an input;
a plurality of peak current controllers;
a plurality of outputs to output different voltages to drive different LED strings;
a plurality of switched mode boost converters connected to the input and each of the plurality of switched mode boost converters is configurable to output to any of the plurality of outputs and at least two of the plurality of switched mode boost converters are configured to output to a same output in the plurality of outputs; and
a switch unit coupled between the plurality of peak current controllers and the plurality of switched mode boost converters, wherein the switch unit is configurable to select a peak current controller from the plurality of peak current controllers to drive one of the plurality of switched mode boost converters.

2. An LED driver circuit according to claim 1, wherein each of the plurality of switched mode boost converters is configured to each switch at the same frequency.

3. An LED driver circuit according to claim 2, further comprising a phase generator configured to control a relative phase of switching of each of the plurality of switched mode boost converters.

4. An LED driver circuit according to claim 3, wherein the phase generator is configured to evenly distribute the relative phase of switching of each of the switched mode boost converters which is configured to output to a one of the plurality of outputs.

5. An LED driver circuit according to claim 3, wherein the phase generator is configured to evenly distribute the relative phase of switching of each of the plurality of switched mode boost converters.

6. An LED driver circuit according to claim 1, wherein each of the switched mode boost converters is configured to operate using peak current control, and further comprising a respective peak current control signal generator corresponding to each of the outputs.

7. An LED driver circuit according to claim 6, wherein the switch unit is configurable to direct a respective peak current control signal from the peak current control signal generator corresponding to a one of the plurality of outputs to each of the switched mode boost converters which are configured to output to the respective one of the plurality of outputs.

8. An LED driver circuit according to claim 1, further comprising a buck converter for driving at least one LED string and having as an input a one of the plurality of outputs.

9. An LED driver circuit according to claim 8, further comprising at least one further buck converter, each for driving respective at least one LED strings and arranged such that each of the plurality of outputs is input to a respective one of the buck converters.

10. An LED lighting circuit comprising an LED driver circuit as claimed in claim 1, and at least one string of LEDs driven by the LED driver arrangement.

11. A controller, for an LED driver circuit according to claim 1, and comprising a plurality of switched mode boost converter controllers, a phase generator, first and second peak current control signal generators, and a plurality of switched mode buck converter controllers,
the controller being configurable:
to control a first group of the switched mode boost converters in response to one or more outputs from the phase generator and a peak current control signal from the first peak current control signal generator; and to control a second group of the switched mode power boost converters in response to one or more further outputs from the phase generator and a further, different, peak current control signal from the second peak current control signal generator.

* * * * *